Patented July 2, 1940

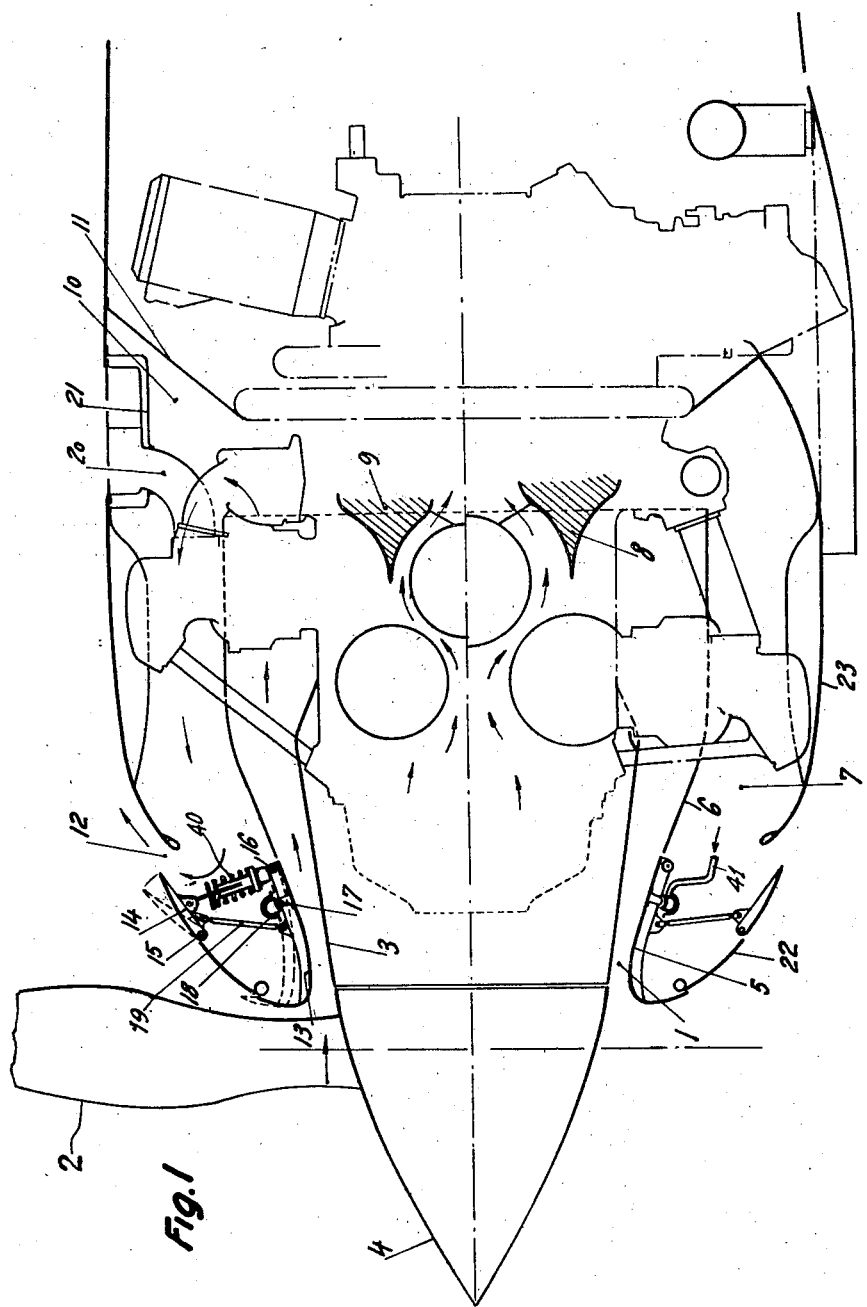

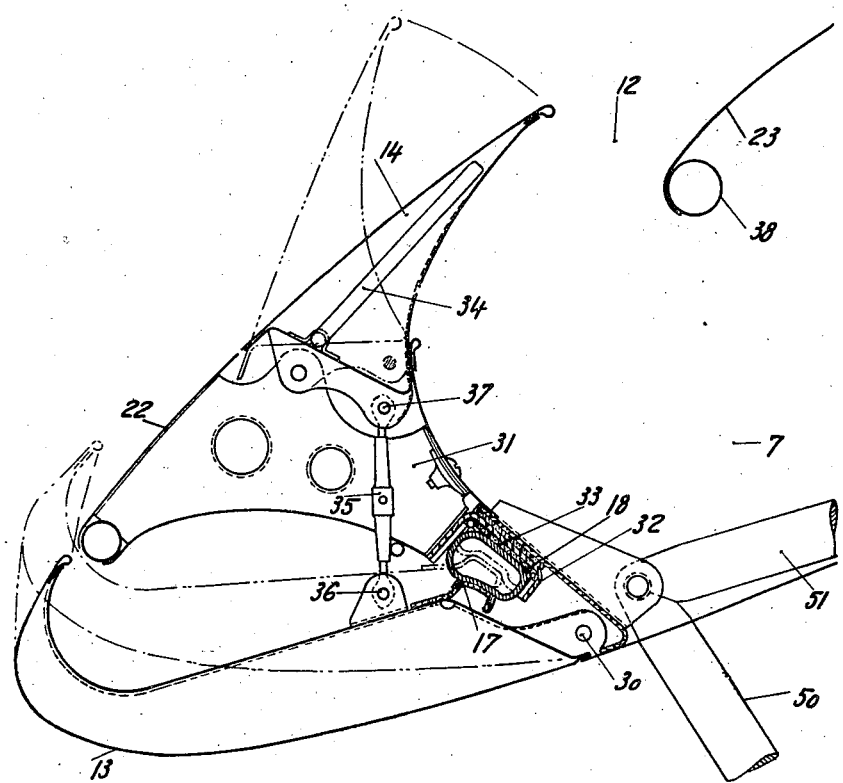

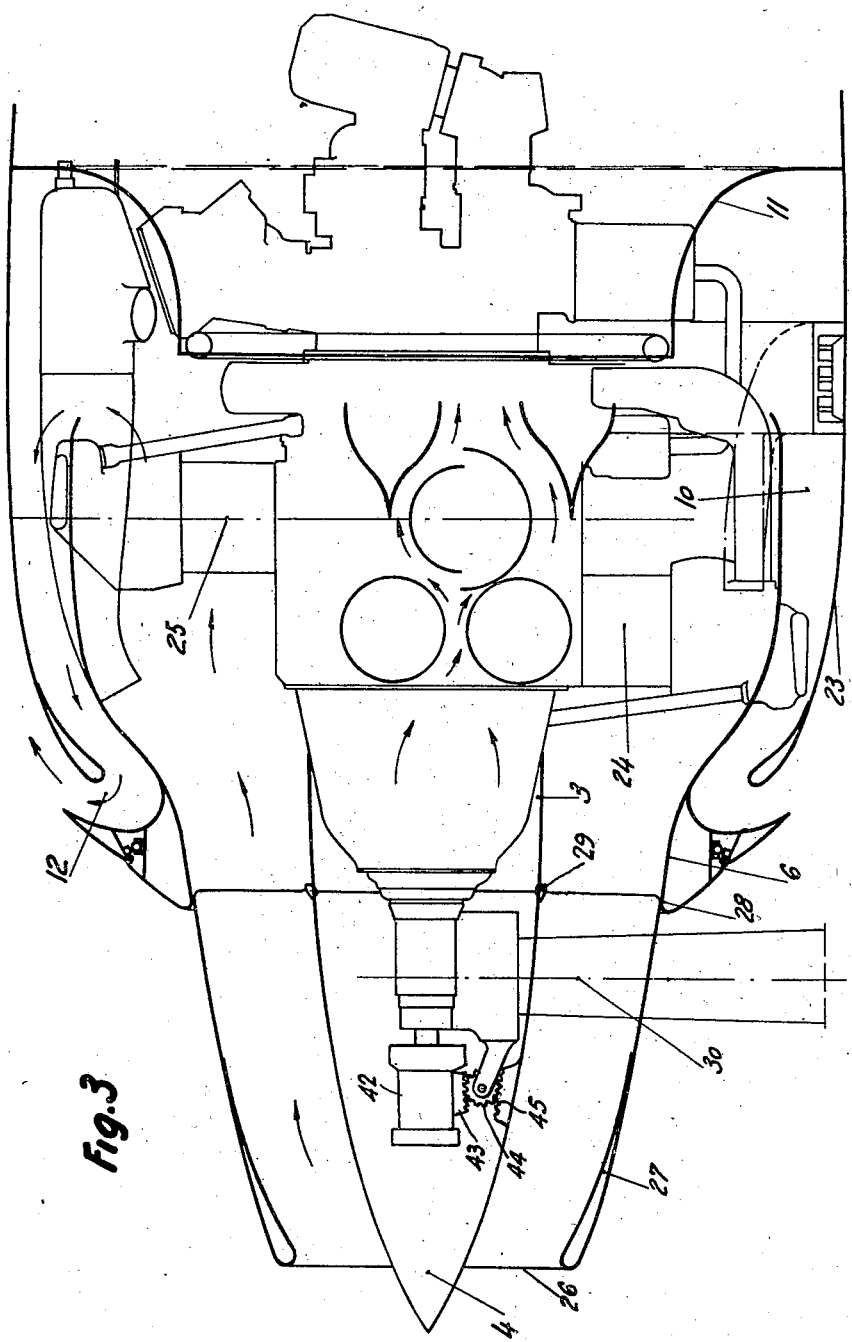

2,206,417

UNITED STATES PATENT OFFICE 2,206,417

COWLING FOR AIRCRAFT ENGINES

Pierre Ernest Mercier, Paris, France

Application May 25, 1937, Serial No. 144,592
In France December 23, 1936

3 Claims. (Cl. 123—171)

This invention relates to cowlings for aircraft engines and has for its object to provide an improved cowling intended particularly, though not exclusively, for aerial motors of the star or double star type or those with two rows of cylinders.

According to the invention cooling air is admitted into the cowling behind or in front of the plane of rotation of the propeller by an annular inlet passage an annular inlet conduit which precedes the zone of contact of the air with the surfaces to be cooled, and beyond this zone of contact, the air, after taking up heat is discharged through an annular outlet passage surrounding the inlet passage and terminated by an outlet port opening into atmosphere, while the construction includes at least one engine cylinder having its walls disposed in said inlet passage and having its head disposed in said outlet, means comprising proper spacing of said intermediate and inner walls so as to form, between the inlet port and said cylinder walls surface, a progressively increasing cross section of said inlet passage toward said surface, and proper spacing of said intermediate and outer walls so as to form, between said cylinder head surface and the outlet port a progressively decreasing cross section of said outlet passage towards said outlet port.

One method of constructing the cowling thus designed and in which the inlet port for the cooling air is behind the plane of rotation of the propeller, is furthermore characterised by the fact that the inlet port (the reduced section of the inlet passage) of the one part and the annular outlet port of the other part are simultaneously adjustable by the same control device, which ensures the minimum of expenditure of energy to maintain the circulation necessary for the cooling of the engine at different speeds and outputs.

The said control mechanism according to one particular embodiment of the invention may comprise a deformable chamber arranged in a suitable recess, integral with the fixed part of the cowling in which chamber a fluid under pressure can be admitted and against which act suitable bosses carried by the movable members or flaps controlling the air inlet or outlet ports. The flap or flaps controlling the port not controlled directly by the deformable chamber are coupled to the other flap or flaps which are controlled by the chamber, by adjustable connecting rods, whilst springs or equivalent members which oppose the action of the fluid admitted into the chamber, exert their action on one or other of the said flaps.

Another embodiment in which the inlet of the air admitted into the cowling is in front of the plane of rotation of the airscrew is characterised by the fact that all or a portion of the divergent part of the inlet or delivery passage which ensures the slowing down and the guiding of the cooling air admitted, is integral with the propeller and rotates therewith; furthermore, the control which effects regulation of the outlet port for the air circulating in the interior of the cowling is then necessarily separate from that which is to modify the inlet section.

This latter control may be advantageously combined with the control for regulating the pitch of the airscrew when the latter is of the variable pitch type, which is generally the case. It is then sufficient to utilise the angular rotation of the blades, or the displacement of the member controlling the blade pitch, to vary the inlet port in question. Under these conditions, there will correspond to each value of the airscrew pitch a value of the inlet port opening. Since the pitch of the airscrew is itself related to the speed of translation of the aircraft and to the power developed by the engine, it will be understood that this method of control permits automatic and effective adjustment of the inlet port according to the conditions of use of the engine (power and speed of translation).

The variation of the inlet port itself may be carried out in different ways without departing from the scope of the invention. By way of example, however, it may be stated that this variation can be obtained by moving the casing covering the airscrew hub relatively to the diverging part of the cowling referred to above. Further, the inlet port may be controlled by small flaps similar to the flap for regulating the outlet port. Finally, an annular inflatable container may be employed in the inlet port so as to increase or reduce the free passage offered to the air at the inlet of the cowling.

The invention will be more clearly understood by reference to the accompanying drawings which show, by way of example, two embodiments of the invention.

In the drawings,

Figure 1 shows an embodiment with the admission for the cooling air behind the plane of rotation of the airscrew and with common control of the inlet and outlet ports;

Figure 2 shows in more detail and on a larger scale the control mechanism included in Figure 1; and Figure 3 is another embodiment of the invention, with admission of the cooling air in front of the plane of rotation of the airscrew, and with rotating inlet tube.

Figure 1 shows the application of the invention to the cowling of an engine of the double star type; the supply conduit or inlet port 1 opening immediately behind the plane of rotation of the airscrew 2. The conduit 1 is bounded by a cowling part 3 which forms a continuation of the propeller cap 4. Towards the outer or inlet end the delivery conduit 1 is controlled by movable flaps 5, and towards its inner end this conduit is bounded by a cylindro-conical partition 6 separating the conduit 1 from a return conduit 7. The air which, after circulating between the engine cylinders, as shown by the arrows, sweeps round screens or deflectors 8 and 9, enters a chamber 10 arranged behind the engine and bounded towards the rear by a shot-proof plate 11, the chamber 10 communicating over the whole of its circumference with the discharge conduit 7 which terminates in an outlet port slot 12. The port or slot 12 and the reduced inlet section 1, are controlled by flaps 13 and 14 movable about pivots 15 and 16, the flaps 13 and 14 being shown in dotted lines in their fully open positions.

The flaps 13 carry shoulders 17 which bear against a deformable chamber 18 to which a control fluid is supplied. The flaps 14 are moved by the flaps 13 through rods 19. Figure 1 shows a screw blade 2 and a spring 40 acting in opposition to the fluid pressure within the chamber 18 and thus tending to close the effective opening of the slot 12 and to reduce the inlet port or section 1.

In the case of Figure 1, an inlet manifold is shown which serves to guide the fluid into the air chamber and is controlled by the pilot or operator by known means. As also shown in this figure, exhaust manifolds 20 open or terminate behind a screen 21 outside the cowling. All the parts, including the flaps 13 and 14 and the front fixed portion 22 of the cowling are carried by a light framework supported on the engine but not shown in the drawings. The rear portion 23 of the cowling which portion is independent of the forward cowling part, may be of the detachable type such as currently employed in this general type of cowling.

Figure 2 shows on a larger scale the detail of the front portion of the hooding seen in section as included in the upper part of Figure 1. The movable flap controlling the inlet port is shown at 13 and is hinged at 30 on a rib 31 forming a reinforcement for the fixed part 22 and connected with the front of the engine by means of framework the fore part of which is shown at 50 and 51.

The deformable chamber 18 is clearly visible inside a channel 32 integral with the rib 31 and similar parts, and supported by them from the front of the engine. A heat insulating material, shown in section at 33, has for its object to protect the chamber 18 from the heat radiated by the hot air circulating in the outlet conduit 7.

The boss 17 on the flap 13 bears against the chamber 18 under the action of springs shown diagrammatically at 34 and acting by abutment of one flap 14 on the next flap. The spring force thus applied to the flap 14 is transferred to the flap 13 through the rod 35 which is adjustable in length and is hinged at 36 on the flap 13 and at 37 on to the flap 14.

The cowling 23 adjacent to the outlet section or slot 12 terminates in a tubular reinforcement shown in section at 38.

The engine shown in Figure 3 is of the double row type, the rows of cylinders being indicated at 24 and 25. The inlet port or section for the cooling air is shown at 26, the air circulating between the propeller cap 4 fairing the hub of the propeller and the diverging part 27. The cap 4 and part 27 rotate as a unit with the propeller, and adjoin, at 28 and 29, with the necessary clearance the parts 6 and 3 which are fixed to the engine and form a continuation thereof.

Enclosed arms (not shown) serve to centre the part 27 with respect to the part 4. Other arms (not shown) ensure the relatively fixed spacing of the fairings 6 and 23 with respect to the engine. The air circulates in the direction of the arrows and passes aft over the cylinder fins in the direction left to right, as viewed in the drawings and then returns along the peripheral annular channel 10 in the direction right to left, to be finally discharged through the adjustable port or slot 12. The back of the cowling is closed by an annular wall 11. The airscrew is of the three-blade type, a part of one blade being shown diagrammatically at 30.

In Figure 3 a cap 42 is shown having an axial displacement which causes the pitch of the screw to vary in known manner. The foot of the latter carriers a pinion 44 which meshes with two racks 43 and 45, one of which is integral with the cap 42 and the other with the revolving part or spinner 4. Thus the displacement of the cap 42 to the right which is controlled by the pilot by known means, entails a displacement to the left on the part of the spinner 4, which reduces the inlet section 26.

For effective operation of the diverging part of the air inlet conduit both in the form of Figure 1 and in that of Figure 3 it is necessary that the air admitted be disturbed as little as possible by the rotation of the airscrew. As the roots of the propeller blades (particularly in variable pitch propellers) are generally but little closed and are of almost circular section, the invention affords special fairing of the blade roots, which fairing may either be fixed to the capping at the level of the insertion of the blade or may be fixed to the blade itself, or if it is flexible (fabric, leather, reinforced rubber, etc.) it may be fixed to both.

Although the invention has been more particularly described in its application to the cooling of engines of the star type or to those of the double row type, it will be understood that the invention is capable of numerous other applications and in particular to the cooling of engines in line or in V arrangement, or to ensure the proper control of the circulation of cooling air directed on to a radiator or any other similar part used in aeronautics.

What I claim as my invention and desire to secure by Letters Patent of the United States is:

1. In an aircraft, in combination, an engine, a variable pitch airscrew driven thereby, means for regulating the airscrew pitch, an inner annular cowling wall, an outer annular cowling wall around and spaced from the said inner wall, an intermediate cowling wall between and spaced from the said inner and outer walls, the space between the inner and intermediate annular walls constituting a cooling air inlet passage open to the atmosphere at its forward end to form an air inlet port lying to one side of the plane of rotation of the airscrew, whilst the annular space between the intermediate and outer annular walls constitutes a cooling air outlet passage open at its forward end to form a cooling air outlet port, at least one engine cylinder having its walls disposed in said inlet passage and having its head disposed in said outlet, means comprising proper spacing of said intermediate and inner walls so as to form, between the inlet port and said cylinder walls surface, a progressively increasing cross section of said inlet passage toward said surface, and proper spacing of said intermediate and outer walls so as to form, between said cylinder head surface and the outlet port a progressively decreasing cross section of said outlet passage towards said outlet port, means whereby the cooling air after flowing aft from the air inlet port to the surface to be cooled is directed forward through the air outlet passage and thence through the air outlet port to the atmosphere, a device for regulating the effective opening of the air inlet port, and control means common to the said regulating device and to the means for regulating the airscrew pitch.

2. An aircraft engine comprising, in combination, a cowling having an inner annular wall, an outer annular wall around and spaced from the inner annular wall, an intermediate annular wall between and spaced from the said inner and outer walls, the space between the inner and intermediate annular walls constituting a cooling air inlet passage open to the atmosphere at its forward end to form an annular air inlet port, whilst the annular space between the intermediate and outer annular walls constitutes a cooling air outlet port open at its forward end to form an air outlet port, at least one engine cylinder having its walls disposed in said inlet passage and having its head disposed in said outlet, means comprising proper spacing of said intermediate and inner walls so as to form, between the inlet port and said cylinder walls surface, a progressively increasing cross section of said inlet passage toward said surface, and proper spacing of said intermediate and outer walls so as to form, between said cylinder head surface and the outlet port a progressively decreasing cross section of said outlet passage towards said outlet port, means whereby the cooling air after flowing aft from the air inlet port and through the air inlet passage to the surface to be cooled is directed forward through the outlet passage and through the outlet port to the atmosphere, a device for regulating the effective opening of the inlet port, a device for regulating the effective opening of the outlet port, a rod connecting the said devices together, means for adjusting the length of the said rod, a deformable chamber the wall of which transmits regulating movement to one of the regulating devices, and means for controlling a supply of fluid under pressure to the deformable chamber, thereby simultaneously actuating the said regulating devices.

3. In a cowling for an aircraft engine, in combination, an inner annular wall, an outer annular wall around and spaced from the inner wall, an intermediate annular wall between and spaced from the inner and outer walls, the annular space between the inner and intermediate walls constituting a cooling air inlet passage open at its forward end to form an air inlet port open to the atmosphere, whilst the annular space between the intermediate and outer annular walls constitutes a cooling air outlet passage open at its forward end to form an air outlet port open to the atmosphere, means whereby the cooling air after flowing aft from the inlet port through the inlet passage to the surface to be cooled is directed forward through the outlet passage and through the outlet port to the atmosphere, a hinged flap valve controlling the inlet port, a hinged flap valve controlling the outlet port, and a deformable chamber to which fluid under pressure is supplied for operating at least one of the said flap valves, the cross-section of the inlet passage increasing in the direction of flow of air therethrough whilst the cross-section of the said outlet passage decreases in the direction of airflow therethrough.

PIERRE ERNEST MERCIER.